(12) United States Patent
Sun

(10) Patent No.: US 8,490,507 B2
(45) Date of Patent: Jul. 23, 2013

(54) ROTARY SWASH PLATE TYPE CONTINUOUSLY VARIABLE TRANSMISSION

(75) Inventor: Jiandong Sun, Beijing (CN)

(73) Assignee: Beijing Union University, Beijing (CN)

( * ) Notice: Subject to any disclaimer, the term of this patent is extended or adjusted under 35 U.S.C. 154(b) by 626 days.

(21) Appl. No.: 12/667,671

(22) PCT Filed: Nov. 12, 2009

(86) PCT No.: PCT/CN2009/001249
§ 371 (c)(1),
(2), (4) Date: Jan. 4, 2010

(87) PCT Pub. No.: WO2010/142067
PCT Pub. Date: Dec. 16, 2010

(65) Prior Publication Data
US 2011/0146428 A1    Jun. 23, 2011

(30) Foreign Application Priority Data

Jun. 8, 2009   (CN) .......................... 2009 1 0086238
Nov. 4, 2009   (CN) .......................... 2009 1 0210482

(51) Int. Cl.
*F16H 37/12*   (2006.01)

(52) U.S. Cl.
USPC ................................. 74/60; 74/125.5; 74/129

(58) Field of Classification Search
USPC ................... 74/60, 112, 126, 128, 129, 125.5
See application file for complete search history.

(56) References Cited

U.S. PATENT DOCUMENTS

| 1,869,189 A | * | 7/1932 | Eggert ........................ 74/123 |
| 2,546,282 A | * | 3/1951 | Reginald ........................ 74/63 |
| 4,873,893 A | * | 10/1989 | Blakemore .................... 475/16 |

* cited by examiner

*Primary Examiner* — William C Joyce
(74) *Attorney, Agent, or Firm* — Pedersen and Company, PLLC; Ken J. Pedersen; Barbara S. Pedersen

(57) ABSTRACT

A rotary swash plate type continuously variable transmission comprises a driving mechanism, an output mechanism and a casing 24. The driving mechanism comprises a rotational swash plate 9 with variable angle of inclination and at least three slide stems which are disposed parallel and equiangular with each other. Each slide stem is equipped with a one-way rotary helical gear 13 at one end, and contacts with and slides on the surface of the swash plate at the other end. The output mechanism comprises a one-way rotational output shaft 16 and a larger helical gear 14 which is disposed on the output shaft 16 and meshed with the helical gears 13. The transmission according to the invention is compact in view of structure and smooth in view of its output rotational speed. Moreover, the minimal rotational speed may be zero.

4 Claims, 3 Drawing Sheets

ROTARY SWASH PLATE TYPE CONTINUOUSLY VARIABLE TRANSMISSION

This application is a 371 U.S. National Stage Entry of PCT/CN2009/01249, which claims priority of Chinese Applications CN200910086238.X, filed Jun. 8, 2009, and CN200910210482.2, filed Nov. 4, 2009.

FIELD OF THE INVENTION

The present invention refers to a rotary swash plate type continuously variable transmission, more particularly, a continuously variable and pulsating transmission which takes advantages of plunger principle of the plunger pump.

BACKGROUND OF THE INVENTION

Transmission is widely used in the field of chemical industry, textile, foodstuff, sewage cleaning, etc. There are mechanical transmissions and electronic transmissions. Most continuously variable mechanical transmissions are bell type transmissions or planetary gear type transmissions. The former tends to be damaged due to aging and fatigue of the belt. The later is larger and needs a hydraulic control device, which limits its application and also makes it tend to be damaged. A coaxial connecting rod stepless pulsating transmission was published in patent application No. CN200510132746.9, which uses an eccentric wheel with a slanting cylindrical profile, wherein the side periphery of the eccentric wheel is jacketed with a slide ring which has a center bore corresponding to the outer shape of the slanting cylindrical eccentric wheel, i.e., the center bore is a slant bore with the same gradient as the slanting cylindrical eccentric wheel. When the bottom of the slanting cylindrical eccentric wheel is concentric with the input shaft, zero variable ratio change can be achieved. This transmission has overcome some shortages in the prior art, such as being complex and huge, expensive in view of manufacturing cost, inconvenient to maintain, and difficult in changing rotational speed ratio. This transmission not only has simple and compact configuration, but also is low in manufacturing cost and convenient to maintain. More importantly, it can provide very low minimal rotational speed ratio change, such as zero, so its ratio can vary from zero to maximal design value. Moreover, it may change speed not only in stopping state, but also in operating state. However, its pulsating magnitude varies with the number of connecting rods. The smaller the desired pulsating magnitude is, the more the required connecting rods are, and conversely, the larger the desired pulsating magnitude is, the less the required connecting rods are. It is, however, impossible to set too many connecting rods considering its configuration, which imposes limit when smaller pulsating magnitude is needed.

SUMMARY OF THE INVENTION

The purpose of the invention is to provide a mechanical and pulsating continuously variable transmission, which can realize continuously and smoothly variable ratio change by means of the way by which a plunger of the plunger pump performs, while being simple in structure and having fewer parts that tend to be damaged.

In order to realize above purpose, a rotary swash plate type continuously variable transmission according to the present invention comprises a driving mechanism, an output mechanism and a casing. The driving mechanism comprises a rotational swash plate with variable angle of inclination and at least three slide stems which are disposed parallel with each other and spaced equiangularly relative to the periphery of the swash plate. Each slide plate stem at one end is equipped with a one-way rotary helical gear and at the other end contacts with and may slide on the surface of the swash plate. The output mechanism comprises a one-way rotational output shall and a larger center helical gear which is disposed on the output shaft and meshed with the one-way rotary helical gears.

A slide stem holder is disposed in the casing. Parallel spline holes are equiangularly, or in other words spaced with each other at equal distances, in a cylinder in the slide stem holder that is coaxial with the holder itself, formed inside the slide stem holder, with each one corresponding to one of the slide stems. Each slide stem with outer spline is placed in the corresponding spline holes of the slide stem holder and can move therein toward left and/or right. One end of each slide stem is always in contact with the swash plate by means of a spring disposed in the spline hole. The other end of each slide stem is equipped with a helical gear, in which a one-way rotational overrun clutch is mounted. The outer ring of the clutch is fixedly connected with the helical gear and its inner ring is fixedly connected with the slide stem. The helical gear thereby can rotate only in one direction relative to the slide stem. All of the helical gears are meshed with the larger helical gear of the output mechanism.

A rotational input shaft comprises an annular recess at one end, a radical pin hole at the other end and an inner hole axially formed, wherein a nut is engaged with a screw so that the nut may move toward left and/or right in the inner hole by turning the screw. A through groove is axially slotted on the input shaft which spans the movement distance of the nut. The screw is supported at the other end by an end cover and is fixedly connected by a key to a revolution adjusting sleeve secured on the input shaft at a part protruding from the end cover. A fastening bolt is mounted at the mouth of the adjusting sleeve with its bottom inserted into the recess of the end of the input shaft. The adjusting sleeve projects out of the casing. A connecting rod and the input shaft grip each other, wherein one end of the connecting rod is hinged with the nut by means of a pin which passes through the through groove formed in the input shaft, while the other end is hinged with the swash plate. The swash plate has a bore with a diameter larger than that of the input shaft, by which the swash plate is mounted on the input shaft. A dual-lug pin boss with a pair of parallel lugs located on both sides of the bore is disposed on the back surface of the swash plate. Two pairs of transverse pin holes are formed on the dual-lug pin boss, wherein one pair of pin holes are radically aligned with the pin hole formed on the input shaft so that the swash plate and the input shaft are hinged together by means of two pins passed through them. The other pair of pin holes are hinged with the connecting rod also by pins.

The input shaft of the transmission is rotatably held in the casing by a pillow block and a stopper, and may rotate under an exterior torque applied through a key. The output shaft is also rotatably supported in the casing. The output mechanism in the transmission comprises the output shaft and the larger center helical gear mounted thereon.

In addition, in order to make the slide stem slide freely on the swash plate surface, a wear-resistant material with lower friction coefficient can be coated on the swash plate surface, such as nylon gasket or polycarbonate. Alternatively or additionally, rollers can be installed on one end of the slide stems contacting the swash plate. Alternatively or additionally, an oil hole can be formed on the casing above the swash plate, through which lubricant drops on the swash plate surface.

The transmission according to the present invention has the following advantages relative to the known continuously variable transmissions:

1) The magnitude of the stroke of the slide stems can be manually regulated by varying inclination angle of the swash plate. As a result, when the stroke of slide stems are set to zero, minimum rotational speed can be set to zero.

2) By increasing the number of slide stems, small magnitude of pulsation and smooth output rotational speed can be realized.

3) Axial lines of the input shaft and the output shaft may be aligned so that a coaxial continuously variable transmission can be formed.

REFERENCE NUMERALS

1—input shaft, 2—nut, 3—screw, 4—end cover, 5—revolution adjusting sleeve, 6—key, 7—fastening bolt, 8—connecting rod, 9—swash plate, 10—slide stem, 11—slide stem holder, 12—spring, 13—helical gear, 14—larger helical gear, 15—key, 16—output shaft, 17—pin, 18—pin hole, 19—pin hole, 20—through groove, 21—pillow block, 22—stopper, 23—key, 24—casing, 25—shaft bowl, 26—dual-lug pin boss.

DETAILED DESCRIPTION OF THE PREFERRED EMBODIMENT

The invention will be described in detail by reference of the following figures.

Figure 1:
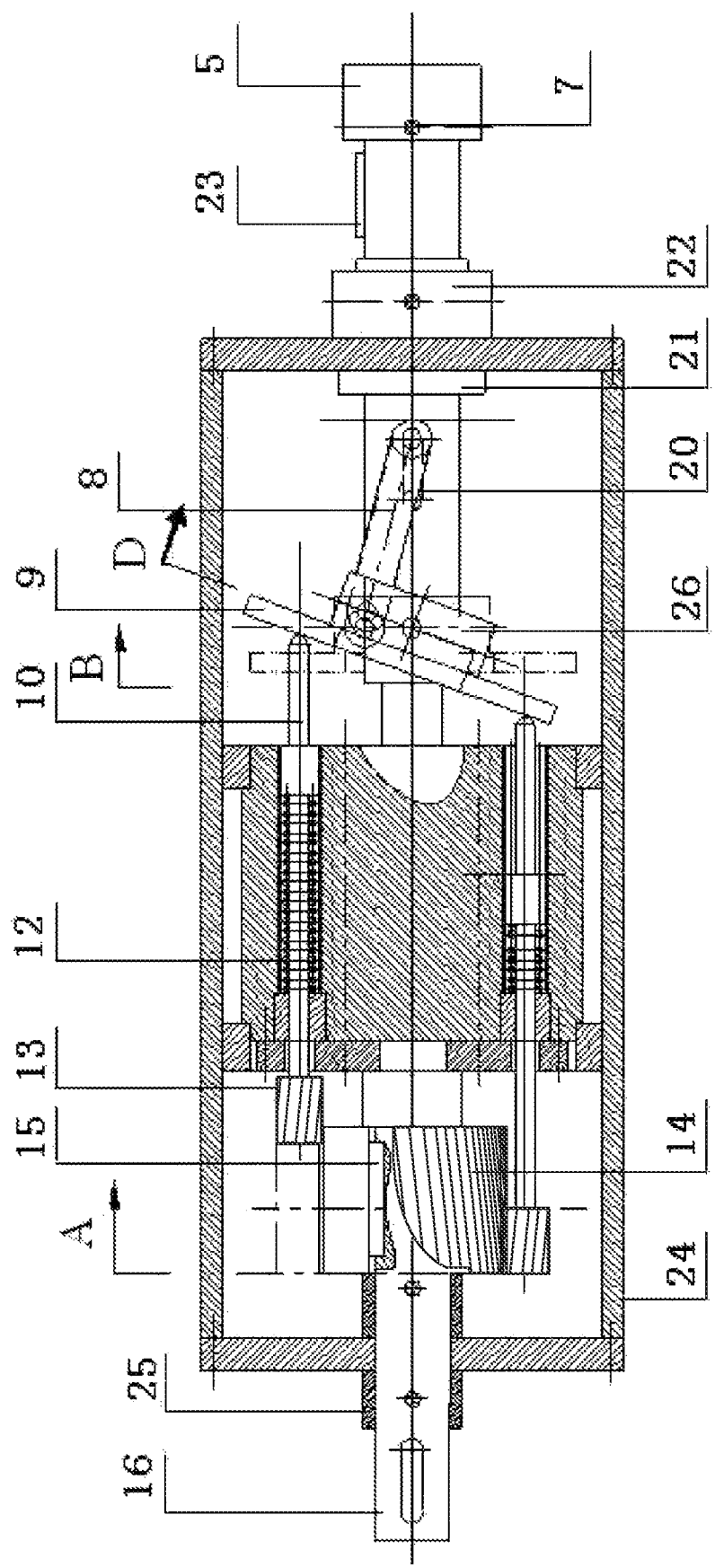
FIG. 1 is schematic view of a rotary swash plate type continuously variable transmission according to a preferred embodiment of the present invention.
Figure 2:
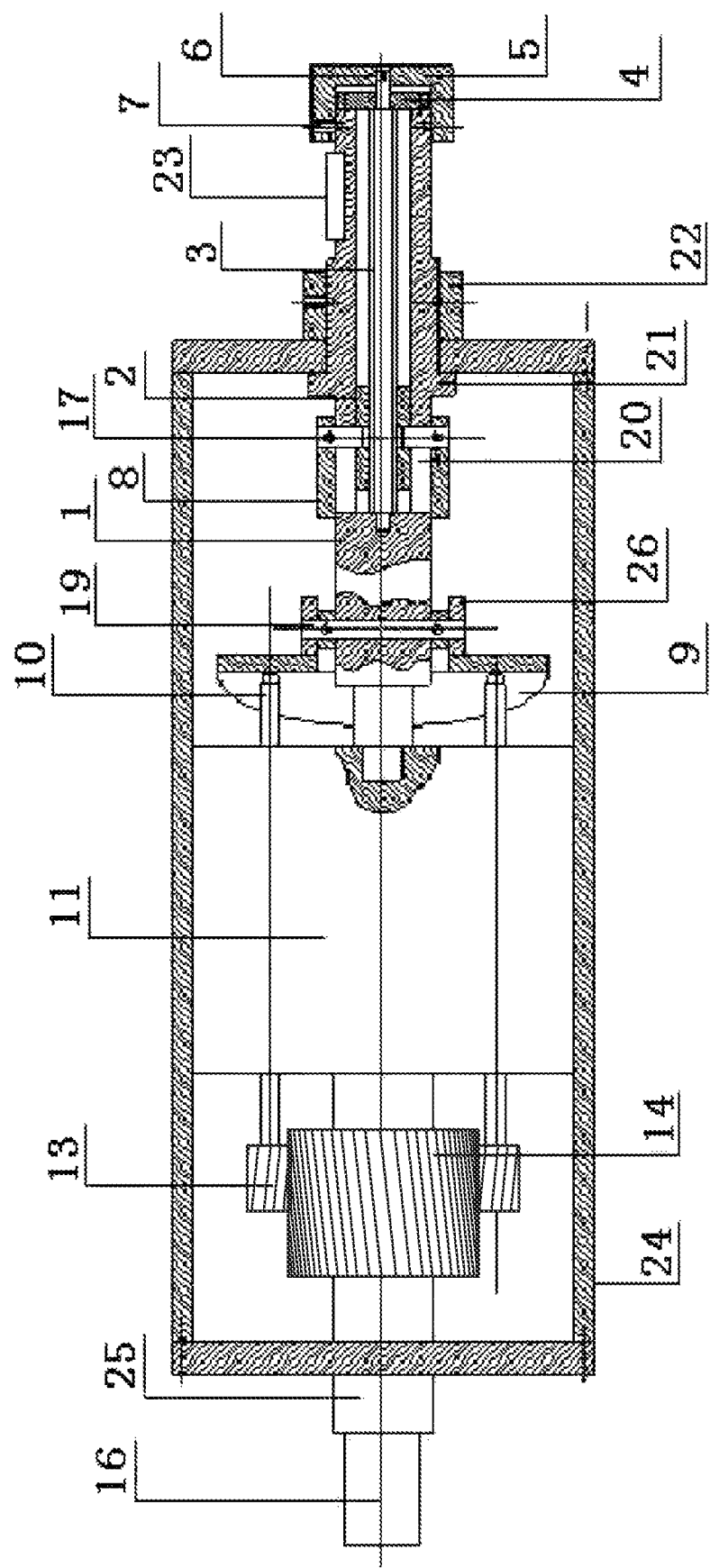
FIG. 2 is a top view of the transmission of FIG. 1.

As shown in FIGS. 1 and 2, an input shaft 1 and an output shaft 16 aligned with the input shaft are rotationally supported in a casing 24. The input shaft 1 is held in the casing 24 through a pillow block 21 thereon and a stopper 22, while the output shaft 16 is supported in the casing 24 through a shaft bowl 25 thereon.

Figure 5:
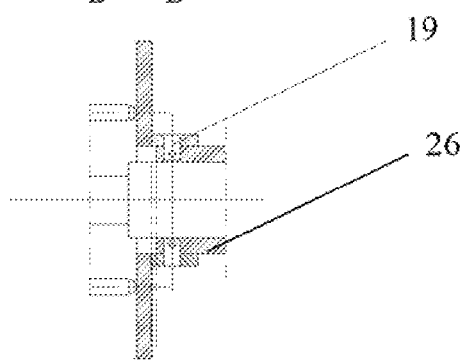
FIG. 5 is a schematic view of FIG. 1 seen along arrow D-D in FIG. 1.
Figure 6:
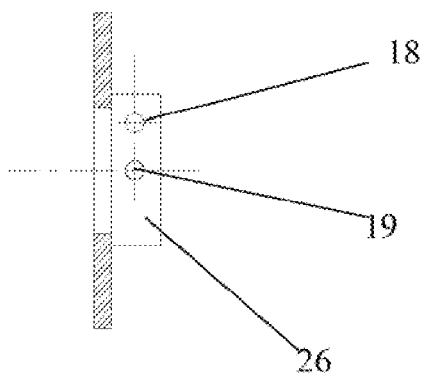
FIG. 6 is a top view of FIG. 5.

An inner hole is formed in the input shaft 1, in which a nut 2 is engaged with a screw 3. The screw 3 is supported by an end cover 4 at its other end protruding from the input shaft 1 where it is connected to a rotatable adjusting sleeve 5 by a key 6. The bottom of a fastening bolt 7 mounted on the mouth of the revolution adjusting sleeve 5 is inserted into the recess of the right end of the input shaft 1. The screw 3 will rotate by turning the revolution adjusting sleeve 5 which in turn drives the nut 2 to move to the left and/or right in the inner hole. A through groove 20 is axially slotted on the input shaft 1 which has a length spanning the distance of movement of the nut 2. A connecting rod 8 is made of two pieces of strip plates with pin holes formed on both ends. The input shaft 1 is sandwiched between the strip plates at one end of the connecting rod 8. The connecting rod 8 and the nut 2 are hinged together by means of two pin shafts 17 which pass through a pair of pin holes formed on the end of the connecting rod 8 and the groove 20 formed on the input shaft 1. The connecting rod 8 is hinged at the other end on the swash plate 9. As shown in FIGS. 5 and 6, the swash plate 9 is a circular plate with a bore in the center having a diameter slightly larger than that of the input shaft 1, and thereby fitted around the input shaft 1 and capable of inclining within an angular range. A dual-lug pin boss 26 is disposed on the back surface of the swash plate 9 with a pair of parallel lugs located both sides of the bore. Two pairs of pin holes 18 and 19 are transversely formed on the dual-lug pin boss. Wherein, pin holes 19 are in the line of the diameter and hinged with input shaft 1 (there are also pin holes arranged radially on the input shaft 1). The pin holes 18 are hinged with the connecting rod 8 by means of pins. The left and/or right movement of the nut 2 varies the inclination angle of the swash plate 9 through connecting rod 8. One extreme position of the swash plate 9 is perpendicular to the axis of the input shaft 1.

According to the invention there are three or more slide sterns 10; there are four in the illustrated embodiment. In FIG. 1, outer splines are formed on a part of the outer ring of each slide stem 10 so that it can move left and/or right in the spline hole of the slide stem holder 11. A spring 12 in the spline hole always tends to force the slide stem 10 to move right.

Figure 3:
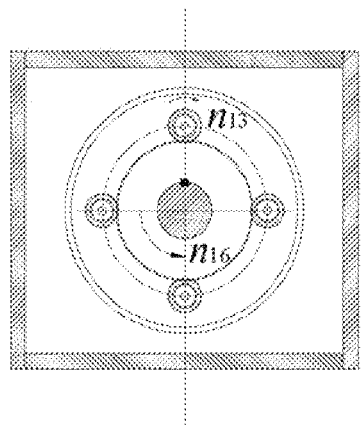
FIG. 3 is a schematic view of FIG. 1 seen along arrow A-A in FIG. 1.

The slide stems 10 contact the swash plate 9 at their right ends and at their left ends are equipped with helical gear 13 in which one-way rotational overrunning clutches are mounted. The outer ring of each clutch is fixedly connected with the helical gear 13 and its inner ring is fixedly connected with the slide stem 10, which makes the helical gear 13 rotate only in one direction relative to the slide stem 10, as shown by n13 in FIG. 3. The slide stems 10 can only move left and/or right and cannot rotate so that the helical gears 13 also move left and/or right following the slide sterns 10. All of the helical gears 13 are meshed directly with the larger center helical gear 14 which is attached to the output shaft 16 by a key 15.

Figure 4:
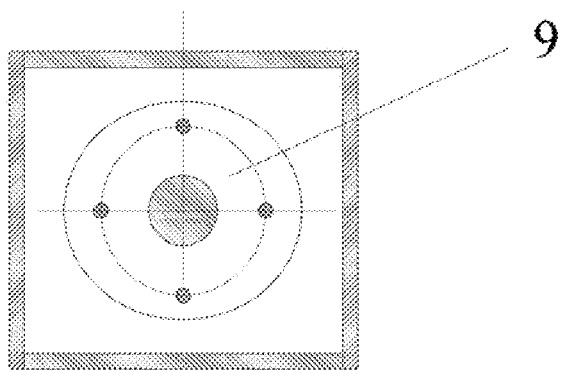
FIG. 4 is a schematic view of FIG. 1 seen along arrow B-B in FIG. 1.

Two ends of the output shaft 16 are supported by the casing 24, and the former can only rotate in one direction, as shown by $n_{16}$, in FIG. 4 relative to the latter.

The continuously variable transmission according to the present invention operates as follows: before it is operated, the rotatable adjusting sleeve 5 is turned to make the screw 3 rotate, and thereby the nut 2 is driven to move left-and/or-right in the inner hole of the input shaft 1. That causes the connecting rod 8 to drive the swash plate 9 to pivot around the pin to regulate the inclination angle of the swash plate relative to the slide stems 10.

The input shaft 1 rotates under a torque received through the key 23 and drives the swash plate 9 to rotate, which in turn drives the upper slide stem 10 in FIG. 1 to move toward the left, while the lower slide stem 10 moves toward right under the acting force of the spring 12. After the swash plate 9 rotates over a half cycle from the position as shown in FIG. 1, the above two slide stems move toward opposite directions. Thus, rotation of the swash plate 9 causes the slide stems 10 to reciprocate axially. The slide stems do not rotate about their own axes when they are moving toward left or right because splines on their outer rings are conform to the slide stem holder 11. The helical gears 13 fixedly installed on the left end of the slide stems are in continuous sliding engagement with the larger helical gear 14. When the slide stems 10 move toward left, the helical gear 13 are driven to move from the right of the larger helical gear 14 to its left while keeping meshing therebetween (operating stroke). Because the helical gears 13 are non-rotational, the larger helical gear 14 rotates over corresponding angle $\Delta\phi 14$. When the helical gears 13 move from the left of the larger helical gear 14 to its right (backward stroke), the helical gears 13 may rotate about the corresponding axis of their slide stems 10 because one-way overrunning clutches are installed therein. When the swash plate 9 has rotated over one cycle, the helical gears 13 would finish one left-right circulation.

Because at least three slide stems 10 and the helical gears 13 are evenly disposed on the circumference of the slide stem holder 11, at least one of the helical gears 13 is always in the operating stroke, so that the bigger helical gear 14 can continuously rotate. The more the number of slide stems 10 and the helical gears 13 evenly disposed on the circumference of the slide stem holder 11 is, the smaller the speed pulsation (fluctuation) of bigger helical gear 14 is.

The invention claimed is:

1. A rotary swash plate continuously variable transmission, comprising:
a driving mechanism, an output mechanism and a casing (24), said casing having a slide stem holder including at least three spline holes,
said driving mechanism comprising a rotational swash plate (9) and at least three slide stems, said swash plate having a periphery, said slide stems disposed parallel to each other in said spline holes and spaced equiangularly relative to the periphery of said swash plate, a spring disposed in each said spline hole biasing said slide stems toward said swash plate, said swash plate having a variable angle of inclination relative to said slide stems, each slide stem equipped at one end with a one-directional rotary helical gear (13), said one-directional rotary helical gear rotatable about said slide stem in only one direction, the other end of said slide stem contacting and sliding on the surface of said swash plate causing said slide stem to reciprocate axially,
said output mechanism comprising a one-way rotational output shaft (16) and a center helical gear (14) disposed on said output shaft (16), each of said one-directional rotary helical gears in direct sliding engagement with said center helical gear,
such that when each said slide stem moves in one direction said one-directional rotary helical gear does not rotate and thereby causes said center helical gear to rotate, and when said slide stem moves in the opposite direction said one-directional rotary helical gear rotates.

2. A rotary swash plate continuously variable transmission, comprising:
a driving mechanism, an output mechanism and a casing (24),
said driving mechanism comprising a rotational swash plate (9) having a variable angle of inclination and at least three slide stems, said slide stems disposed parallel to each other and spaced equiangularly relative to the periphery of said swash plate, each slide stem having outer splines and equipped at one end with a one-directional rotary helical gear (13), the other end of said slide stem contacting and sliding on the surface of said swash plate,
said output mechanism comprising a one-way rotational output shaft (16) and a larger helical gear (14) disposed on said output shaft (16) and meshed with the one-directional rotary helical gears (13) of said slide stems,
said casing having a slide stem holder including at least three parallel spline holes, said slide stems (10) disposed in said spline holes and movable left and/or right in the corresponding spline holes;
a spring (12) disposed in each spline hole for forcing said other end of each slide stem (10) to contact said swash plate (9);
each helical gear (13) containing a one-way rotational overrunning clutch including an outer ring and an inner ring, said outer ring fixedly connected with the helical gear (13) and said inner ring fixedly connected with said slide stem (10), such that the helical gear (13) rotates in only one direction relative to said slide stem (10).

3. A rotary swash plate continuously variable transmission, comprising:
a driving mechanism, an output mechanism and a casing (24),
said driving mechanism comprising a rotational swash plate (9) having a variable angle of inclination and at least three slide stems, said slide stems disposed parallel to each other and spaced equiangularly relative to the periphery of said swash plate, each slide stem equipped at one end with a one-directional rotary helical gear (13), the other end of said slide stem contacting and sliding on the surface of said swash plate,
said output mechanism comprising a one-way rotational output shaft (16) and a larger helical gear (14) disposed on said output shaft (16) and meshed with the one-directional rotary helical gears (13) of said slide stems,
a rotational input shaft (1) with an inner hole axially formed, wherein one end of the input shaft has an annular recess and the other end has a radial pin hole;
a nut (2) in the inner hole is screwed with a screw (3) inserted into the inner hole so that it may move left and/or right in the inner hole by turning the screw (3);
a through groove (20) being axially slotted on the input shaft (1), which has a length spanning the movement distant of the nut (2);
the screw (3) is supported by an end cover (4) at the end opposed to the end screwed with the nut and fixedly connected at the part protruding from the cover to a rotatable adjusting sleeve (5) secured on the input shaft;
a fastening bolt (7) is mounted at the mouth of the rotatable adjusting sleeve (5), which extends outside of the casing and is inserted at the bottom into the recess at the end of the input shaft;
a connecting rod (8) is secured on the input shaft (1), which is hinged at one end to the nut (2) by means of a pin shaft (17) passing through the groove (20) formed on the input shaft (1), and at the other end to the swash plate (9) which is mounted around the input shaft (1) and by means of a bore on the swash plate (9) with a diameter larger than that of the input shaft (1); and
a dual-lug pin boss (26) with a pair of parallel lugs located at both sides of the bore being disposed on the back surface of the swash plate (9); two pairs of transverse pin holes (18,19) are formed on the dual-lug pin boss, wherein pin holes (19) are radially aligned with the pin hole formed on the input shaft (1) and are hinged together by means of pins, and the other pin holes (18) are hinged with the connecting rod (8) also by means of pins.

4. The transmission according to claim 3, wherein said screw (3) is attached to said rotatable adjusting sleeve (5) by a key (6).

* * * * *